INVENTOR
CECIL MILLER,
BY Robert W. Fulwider
ATTORNEY.

July 15, 1952  C. MILLER  2,603,443
BAGGING APPARATUS
Filed Nov. 25, 1947  2 SHEETS—SHEET 2
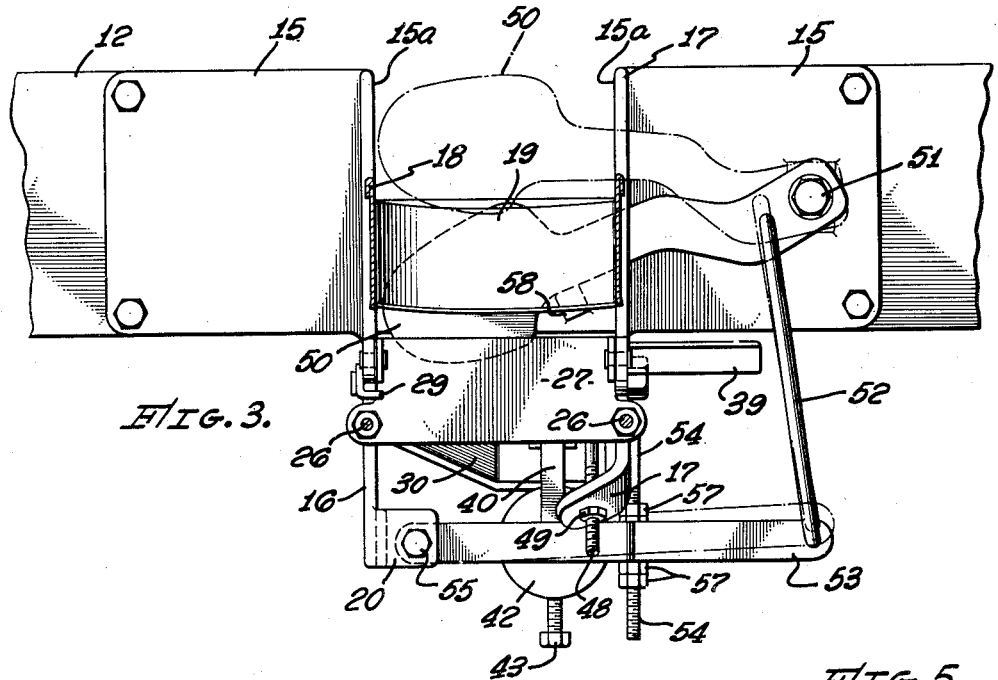
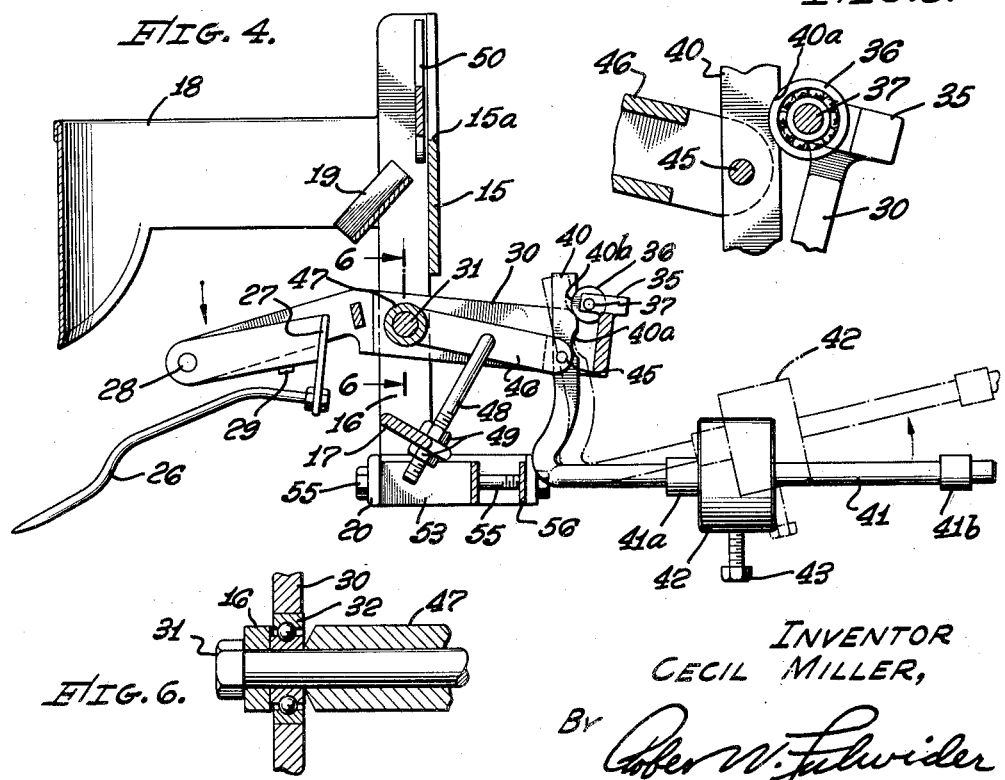
INVENTOR
CECIL MILLER,
BY
Asher W. Fulwider
ATTORNEY.

Patented July 15, 1952

2,603,443

UNITED STATES PATENT OFFICE 2,603,443

BAGGING APPARATUS

Cecil Miller, Pomona, Calif.

Application November 25, 1947, Serial No. 787,927

10 Claims. (Cl. 249—58)

My invention relates generally to automatic packaging apparatus, and more particularly to a scale which is adapted to automatically terminate the flow of material into a bag or other package upon said bag's reaching a predetermined weight.

Previous devices of this sort have been designed, but have usually operated on the principle of a conventional steelyard balance having electrical contacts or other position-sensitive means attached to the balance arm so that when the predetermined weight is reached, an electric circuit is established which closes a gate or otherwise terminates the flow of material into the bag.

The arrangement just described has not been entirely satisfactory due to the fact that such scales have a tendency to "overshoot" or deliver erratic weights by reason of the freedom of motion of the balance arm. It is an easily observed fact that steelyard balances and similar fulcrum mechanisms tend to oscillate about the balance point several times before coming to rest. The result of this oscillating motion is that the balance arm swings an indeterminate amount beyond the desired position of balance before the desired weight has been dumped into the bag.

Another disadvantage of electrical systems is that they require constant attention to maintain them in proper operating condition.

It is a major object of my invention to avoid the effects of "overshooting" by holding the mechanism in fixed position until the predetermined weight has been dumped into the bag, at which time the flow is terminated by trip action.

It is another object of my invention to provide a device of the class described in which the filled bag is dropped slightly when the desired weight is reached, which dropping action alone furnishes the power to operate flow-terminating mechanism.

It is a still further object of my invention to provide a device of the class described which requires no electrical power, and which is simple to install and maintain.

Yet another object of my invention is to provide a bag-supporting mechanism in a bagging machine under which empty bags may be quickly and easily placed and so held that the weight of material dumped into the bags is uniformly and accurately transmitted to the weighing mechanism.

The foregoing and other objects and advantages will become apparent from consideration of the following description of an orange bagging machine embodying my invention.

Briefly described, the machine embodying my invention comprises a bag-supporting frame which is adapted to be supported adjacent a moving belt conveyor in position to receive oranges from the conveyor through an opening in the side wall thereof. The bag frame is supported on a fulcrumed arm which is held in raised position by a weight-actuated latch. The arrangement is such that when the weight of oranges dumped into the bag through the aforesaid opening reaches a predetermined point, the force holding the latch closed is overcome and the bag is allowed to drop. Connecting means between the bag-supporting arm and a gate in the aforesaid opening is provided whereby when the bag drops due to the weight of oranges therein, the gate is closed, preventing further flow of oranges from the conveyor belt.

For a more detailed description of the orange-bagging machine just outlined, reference should now be had to the attached drawings in which:

Figure 3 is an elevational and partially sectioned view taken on the line 3—3 in Figure 2;

Figure 4 is an elevational section taken on the line 4—4 in Figure 1;

Figure 5 is an enlarged elevational section of portions of the latch mechanism taken on the line 5—5 of Figure 1; and, Figure 6 is an enlarged fragmentary elevational section taken on the line 6—6 in Figure 4.

Figure 1:
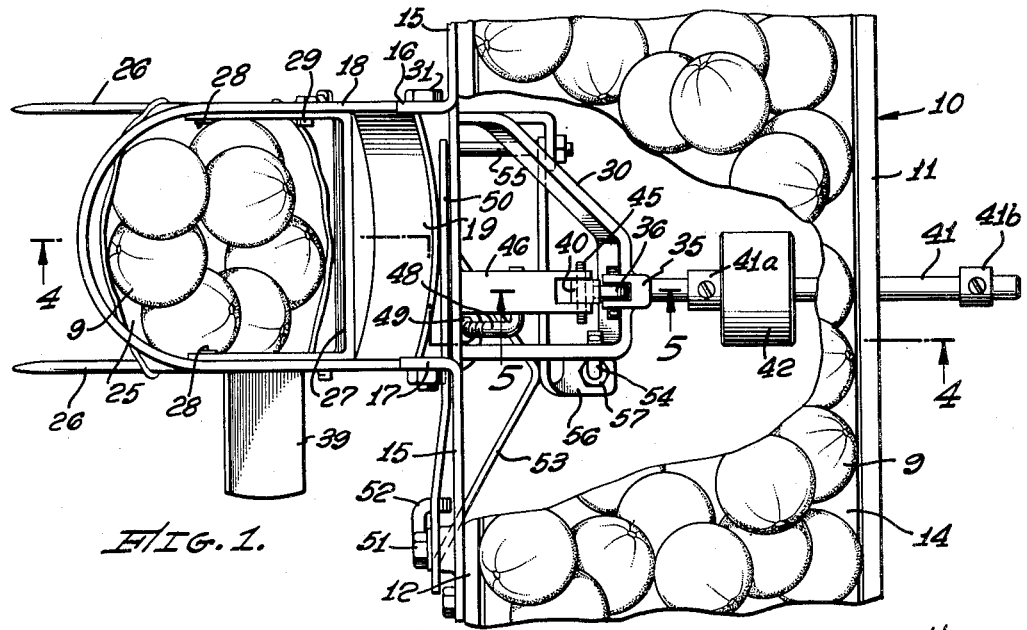
Figure 1 is a plan view of the machine attached to the side wall of a belt conveyor, portions of which are broken away to reveal the mechanism of the bagging machine.

Referring now to the drawings, it will be seen that the belt conveyor to which my bagging machine is attached is indicated generally by the reference character 10. The belt conveyor 10 is comprised of rear and forward side walls 11 and 12, respectively, a flanged bottom 13, and a moving belt 14 supported on the bottom 13. Power mechanisms for moving belts of the class under discussion are well known in the art, and for this reason no detailed description is required herein. Suffice it to say, however, that the motion of the belt 14 is such as to move oranges 9 along the trough-shaped conveyor, the direction of motion being immaterial, i. e., either upwardly or downwardly as viewed in Figure 1.

The bagging machine embodying my invention is bolted to the front wall 12 of the conveyor 10 as can best be seen in Figure 3 As can also be seen in Figure 3, a U-shaped opening 15a is cut in the wall 12 so that normally oranges 9 moving along the conveyor 10 will roll out through the opening 15a as will be described in fuller detail hereinafter. It will be noted that the bottom 14 is canted downwardly to the left in Figure 2 so as to cause the oranges 9 to roll toward the opening 15a as they move along the conveyor 10.

The bagging machine embodying my invention can be conveniently considered as comprising four sub-assemblies; namely, a chassis or supporting frame, a bag-supporting assembly, a latch assembly, and a gate assembly.

The parts of the machine comprising the chassis are welded together into a rigid frame, all parts of which are relatively immovable during operation or adjustment of the machine. The frame is comprised of a flat plate 15 which is bolted against the outer surface of the conveyor side wall 12 and to which a pair of downwardly projecting bars 16 and 17 are secured, the bars being positioned one on either side of the opening 15a as best seen in Figure 3.

Figure 2:
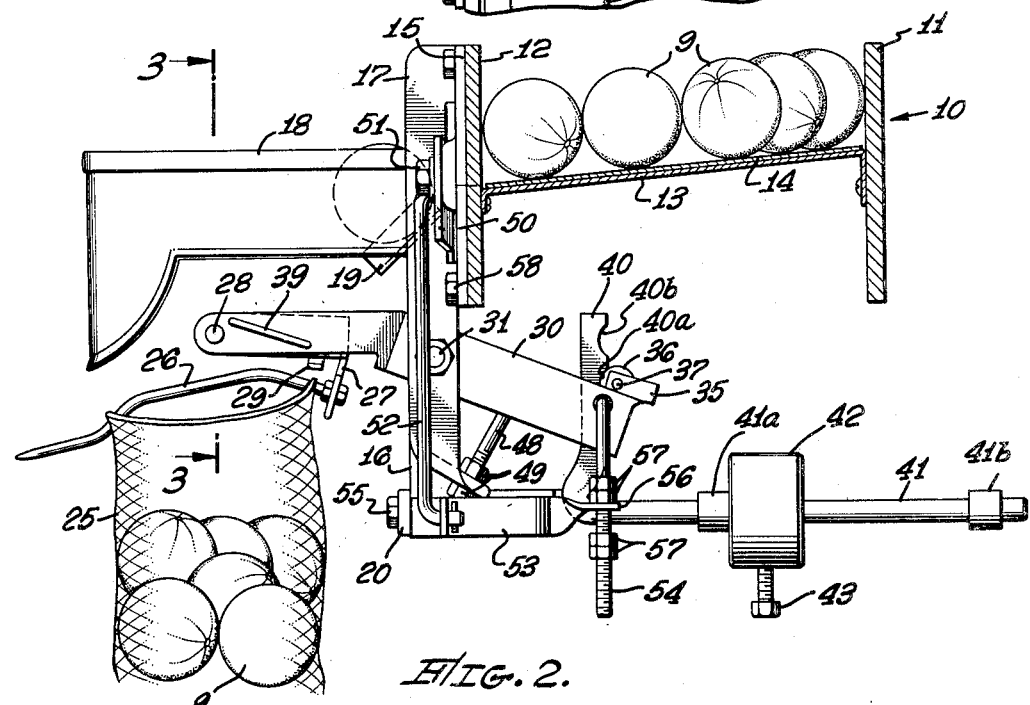
Figure 2 is a partially sectioned elevational view of the mechanism shown in Figure 1.

As can be best seen in Figures 1 and 2, a U-shaped guard 18 is secured to the bars 16 and 17 adjacent the opening 15a. The purpose of the guard 18 is to deflect oranges 9 rolling out of the opening 15a in a downward direction into a bag as will be described in detail later herein.

Welded to the bottom end of the left-hand (Figure 3) bar 16 is a transverse horizontal yoke 20 having a horizontally aligned pivot bolt therein as will be described later.

The lower end of the right-hand vertical bar 17 is bent inwardly and drilled to form an abutment for an adjustment rod as will be described later.

A curved transverse member 19 is spaced from the plate 15 and welded between the bars 16 and 17 adjacent the opening 15a whereby to guide oranges 9 that roll from the opening 15a.

Turning now to a discussion of the bag-supporting assembly, particular reference should be had to Figures 2 and 4. A bag 25 suitable to receive oranges rolling from the opening 15a is supported on the balance mechanism fulcrumed on a pivot bolt 31. The pivot bolt 31 is secured between the vertical bars 16 and 17. Balance mechanism supporting the bag 25 is comprised of a generally U-shaped member 30 pivoted on the bolt 31 and carrying at its left-hand extremities a weight-centering device which includes a bail-shaped member 27 carrying a pair of prongs 26 over which the bag 25 may be stretched as can be seen in Figures 1 and 2. The bail-shaped member 27 is formed with trunnions 28 which are received in journal bearings in the left-hand extremities of the member 30 as stated. Thus the bag 25 hangs freely from the trunnions 28 with its center of gravity directly below the axis determined by the trunnions 28.

In order to prevent the bail-member 27 from over-swinging on its trunnions 28, a small stop 29 is welded to one of the arms of the member 30 as shown, and projects inwardly as can be seen in Figure 1 to prevent more than limited motion of the bail-member 27 and the prongs 26 carried thereby.

A transversely projecting setting handle 39 is welded to the member 30 and serves to lift the bag end of the member 30 as will be described later herein.

At the right-hand end of the member 30, as viewed in Figure 2, is mounted a detent roller 36 which is carried on a pin 37 mounted in a yoke 35, which yoke is welded to the upper edge of the member 30. The detent roller operates in conjunction with the latch mechanism to be described and serves to hold the member 30 in either of two alternate positions shown in Figures 2 and 4.

The details of the latch mechanism which hold the member 30 in fixed position as described, are best seen in Figure 4. The detent roller 36 engages one or the other of a pair of vertically spaced notches 40a and 40b which are formed in a lever arm 40 pivoted on a pivot pin 45 in the bifurcated end of a support arm 46. When the detent roller 36 is engaged with the lowermost notch 40a, the bag-supporting member 30 holds the bag 25 in an "unfilled" position as shown in Figure 2. It will be noted that the lever arm 40 is extended downwardly and bent to form a horizontal weight lever arm 41. A weight 42 is adjustably secured on the weight lever arm 41 by means of a set screw 43.

Thus it can be seen that downward pressure due to the weight of the bag 25 as indicated by the arrow in Figure 4, tends to cause the roller 36 to move upwardly out of the notch 40a. In order for the roller 36 to move, however, it is necessary that the lever arm 40 swing backwardly as shown by a phantom line in Figure 4, raising the weight as shown. It will be seen further that the amount of force necessary to swing the lever arm backwardly due to the upward motion of the roller 36 depends on the position of the weight 42 along the weight lever arm 41. Thus, by adjusting the position of the weight 42, the amount of material in the bag 25 necessary to cause the tilting motion of the member 30 may be determined.

It is desirable when initially adjusting the apparatus that the initial or unfilled position of the member 30 be adjustable. Since the position of the member 30 is dependent upon the vertical position of the notch 40a which receives the detent roller 36, such adjustment may be effected by raising or lowering the pivot bar 45. The foregoing adjustment is accomplished by means of a thrust rod 48 which is bent and engaged with the support arm 46, which arm is in turn welded to a sleeve 47 loosely carried on the pivot bar 31. As will be noted in Figure 4, the lower end of the thrust rod 48 is threaded and carries a pair of adjustment nuts 49 which secure it to the lower end of the bar 17. Thus, by adjustment of the nuts 49, the support arm 46 may be raised or lowered, changing the vertical position of the notch 40a and hence the disposition of the member 30 when in "unfilled" position.

As earlier stated, it is desired that the flow of oranges from the opening 15a be terminated when a predetermined weight is dumped into the bag 25. For this purpose a paddle-shaped gate 50 is provided which is pivotally secured to the plate 15 by a bolt 51 as best seen in Figure 3. Thus, the gate 50 may be raised or lowered to block or clear the opening 15a as shown by the alternate positions indicated in full and phantom lines in Figure 3.

Opening and closing motion of the gate 50 is coordinated with tilting motion of the member 30 by a mechanical linkage which includes a thrust rod 52, a pivoted Y-shaped member 53, and a thrust rod 54. As can be seen best in Figure 3, the Y-shaped member 53 is pivotally supported in the yoke 20 by a pivot bolt 55. As can be seen best in Figure 1, a transversely extending lug 56 is formed by twisting and bending one of the arms of the Y at a point adjacent the juncture of the Y. A suitable aperture is formed in this lug 56 and the thrust rod 54 is extended therethrough. The lower end of the thrust rod 54 is threaded as shown and two pairs of jam nuts 57 are threaded thereto, two above and two below the lug 56.

As can be best seen in Figure 2, a small amount of play is left between the jam nuts and the lug 56. In this way the weight of the gate 50 is not applied to thrust rod 54 until the bag-supporting member 30 has moved somewhat.

It will be noted from an examination of Figure 4 that the gate in opening, drops downwardly to the space between the plate 15 and the transverse guide member 19. A stop 58 is welded to the surface of the plate 15 to support the gate when it is in its lowermost position as shown in Figure 2.

When the bag-supporting member 30 moves due to the weight of oranges in the bag 25, the detent roller moves upwardly along the lever arm 40, dropping into the uppermost notch 40b. As just described, this action pulls upwardly on the rod 54, swinging the Y member 53 upwardly into the position shown in phantom lines in Figure 3, which operates through the connecting rod 52 to close the gate. At the same time that the gate reaches the uppermost position shown in phantom lines in Figure 3, the detent roller 36 drops into the uppermost notch 40b.

When the gate has closed as just described, an operator removes the bag 25 from the prongs 26, replaces it with an empty bag and lifts upwardly on the setting handle 39, thus to return the bag-supporting member 30 to its original position with the detent roller 36 in the lowermost notch 40a. This action also operates through the thrust rod 54 to tilt the Y-shaped member 53 downwardly, opening the gate 50. As soon as the gate 50 opens, oranges again roll through the openings 15a into the bag until the weight thereof again operates the mechanism to terminate the flow.

It should be noted at this point that the removal of the full bag does not re-open the gate until the mechanism has been reset by upward pressure on the handle. This is an important feature provided by the engagement of the roller 36 in the upper notch 40b.

Thus, it will be seen that I have provided a device which is fully mechanical in its operation, requiring no electrical connections or switches. Furthermore, the range of weights that may be weighed out into the bag 25 is adjustable over a relatively wide range by moving the weight 42 along the weight lever arm 41. In some instances it may be desirable to so arrange the machine so it may quickly be set selectively for either of two standard weights; for example, ten or twenty-five pounds. To this end I have provided a pair of adjustable stop collars 41a and 41b which are adjustably positioned on the lever arm 41 and secured thereto by set screws. In this way the two stops 41a and 41b may be set to position such that when the weight 43 is moved against the innermost stop 41a, a smaller weight, for example, ten pounds, is dumped into the bag at each cycle of operation, or alternatively, if the weight is moved outwardly against the stop 41b, a larger weight, say twenty-five pounds, is dumped into the bag at each cycle of operation.

The provision of ball bearings 32 in the bag-supporting member 30 and the provision of a ball bearing in the detent roller 36 so reduces the friction that the accuracy of the device is well above that required for commercial operation. In the weighing of oranges, for example, the variation in weight between successive weighing cycles is but a small fraction of the weight of one orange.

In commercial use of the weighing scale just described, it is customary to mount a number of devices side by side along one side of a conveyor. If for any reason it is desired to operate only one or two of the devices, those which are to be left out of operation may be so adjusted by merely tripping the mechanism by hand to raise the gate. When so tripped, the detent roller 36 falls into the uppermost notch 40b and holds the gate in closed position until it is re-set for operation.

While the device shown and described herein is fully capable of achieving the objects and providing the advantages hereinbefore stated, it is realized that it may be modified somewhat by those skilled in the art without departing from the spirit of the invention. For this reason I do not mean to be limited to the form shown and described, but rather to the scope of the appended claims.

I claim:

1. In apparatus of the class described, the combination of: a balance beam assembly adapted for tilting motion about a fulcrum intermediate its ends; means secured to an outer end of said beam assembly to support a quantity of material to be weighed; separate movable detent means engaged with said beam assembly and adapted to immobilize the same in an initial position until a predetermined weight of material is placed in said supporting means and to thereupon move to release said beam assembly and permit weight responsive movement thereof, said detent means being gravity biased to re-engage the same when said beam assembly is returned to said initial position; controlled means to deliver said material to be weighed into said supporting means, said delivery means including flow terminating means operatively connected with said beam assembly and adapted to be closed by said weight responsive movement of the latter away from said initial position; and an element in said detent means to engage and hold said beam assembly away from said initial position.

2. In apparatus of the class described: a balance beam assembly comprising a pair of parallel arms pivotally supported on a pair of transversely aligned bearings, said arms being joined on one side of said bearings and having a roller mounted thereon adjacent said juncture; means supported adjacent the extremities of said arms on the other side of said bearings to support a quantity of material to be weighed; separate movable detent means positioned adjacent said roller and adapted to be engaged thereby whereby to immobilize said balance beam assembly; and pressure means operatively associated with said detent means and adapted to hold the same in engagement with said roller and further adapted to permit motion of said detent means, release of said roller, and tilting of said balance beam assembly upon a predetermined weight of material being placed in said supporting means.

3. In apparatus of the class described, the combination of: a balance beam assembly adapted for tilting motion about a fulcrum intermediate its ends; means secured to an outer end of said beam assembly to support a quantity of material to be weighed; detent means which includes a member movably mounted on a fixed pivot adjacent said beam assembly, said member having a pair of depressions therein selectively engageable with said beam assembly whereby to immobilize the same in either of two positions thereof; and pressure means operatively associated with said member and adapted to hold the same in said engagement with one of said depressions, said pressure means being further adapted to move to release said member from said engagement whereby to permit tilting of said beam assembly to move said beam into engagement with the other of said depressions upon a predetermined weight of material being placed in said supporting means.

4. In apparatus of the class described, the combination of: a balance beam assembly adapted for tilting motion about a fulcrum intermediate its ends; means secured to an outer end of said beam assembly to support a quantity of material to be weighed; detent means which includes a member movably mounted on a fixed pivot adjacent said beam assembly, said member having a pair of depressions therein selectively engageable with said beam assembly whereby to immobilize the same in either of two positions thereof, said movable member being adjustable vertically whereby to adjust the immobile position of said beam; and pressure means operatively associated with said member and adapted to hold the same in said engagement with one of said depressions, said pressure means being further adapted to move to release said member from said engagement whereby to permit tilting of said beam assembly to move said beam into engagement with the other of said depressions upon a predetermined weight of material being placed in said supporting means.

5. In apparatus of the class described, the combination of: a balance beam assembly adapted for tilting motion about a fulcrum intermediate its ends; means secured to an outer end of said beam assembly to support a quantity of material to be weighed; separate movable detent means engaged with said beam assembly to immobilize the same in either of two alternative positions; pressure means operatively associated with said detent means to hold the same in said engagement, said pressure means being adapted to move to permit release of said detent means from said beam assembly whereby to permit tilting of the latter upon a predetermined weight of material being placed in said supporting means and; controlled means to deliver material to be weighed into said supporting means, said delivery means including a conveyor having an opening therein positioned and adapted to discharge said material directly into said supporting means and a movable gate in said opening operatively connected with said balance beam assembly whereby to move said gate from an open to a closed position in response to said weight responsive tilting of said beam assembly, said gate and beam assembly being so arranged that said gate is open when said beam is in one of said alternate positions and closed when said beam assembly is in the other alternate position.

6. In apparatus of the class described, the combination of: a balance beam assembly comprising a pair of parallel arms pivotally supported on a pair of transversely aligned bearings, said arms being joined on one side of said bearings and having a roller mounted thereon adjacent said juncture; supporting means including a frame pivotally supported at the extremities of said arms, said frame having means therein to support a bag in open-mouthed position to receive material to be weighed therein, said frame being further adapted to permit said bag to hang in vertical position whereby to apply the weight thereof always at the extremity of said beam assembly; detent means which includes a member movably mounted on a fixed pivot adjacent said beam assembly, said member having a pair of depressions therein selectively engageable with said roller whereby to immobilize said beam assembly in either of two positions thereof; adjustable pressure means operatively connected with said movable member and adapted to urge the same into said engagement; and controlled means to deliver said material to be weighed into said supporting means, said delivery means including a conveyor having an opening positioned and adapted to deliver material into said supporting means, and a gate in said opening having lost motion connection with said beam assembly whereby to close said gate upon a predetermined amount of said weight responsive tilting of said beam assembly.

7. In apparatus of the class described: a balance beam assembly adapted for tilting motion about a fulcrum intermediate its ends and having a roller mounted adjacent one end thereof; means supported adjacent the other end of said assembly to support a quantity of material to be weighed; separate movable detent means positioned adjacent said roller and adapted to be engaged thereby whereby to immobilize said balance beam assembly; pressure means operatively associated with said detent means and adapted to hold the same in engagement with said roller and further adapted to permit motion of said detent means, release of said roller, and tilting of said balance beam assembly upon a predetermined weight of material being placed in said supporting means; and a releasable holding element in said detent means positioned and adapted to engage said beam assembly when tilted to hold the same in a tilted position after removal of said material therefrom.

8. In apparatus of the class described, the combination of: a balance beam assembly adapted for tilting motion about a fulcrum intermediate its ends; means secured to an outer end of said beam assembly to support a quantity of material to be weighed; detent means which includes a member movably mounted on a fixed pivot adjacent said beam assembly, said member having a pair of depressions therein selectively engageable with said beam assembly whereby to immobilize the same in either of two positions thereof; pressure means operatively associated with said member and adapted to hold the same in said engagement with one of said depressions, said pressure means being further adapted to move to release said member from said engagement whereby to permit tilting of said beam assembly to move said beam into engagement with the other of said depressions upon a predetermined weight of material being placed in said supporting means; and controllable delivery means positioned and adapted to continuously deliver material to said material-supporting means, said delivery means being operatively connected to said beam assembly whereby said delivery is immediately shut off upon said release of said member and tilting of said beam assembly.

9. The construction of claim 8 further characterized in that said delivery means includes a chute with a movable gate therein.

10. The construction of claim 8 further characterized by having a lost motion connection between said delivery means and beam assembly.

CECIL MILLER.

REFERENCES CITED

The following references are of record in the file of this patent:

UNITED STATES PATENTS

| Number | Name | Date |
| --- | --- | --- |
| 601,674 | Olin | Apr. 5, 1898 |
| 1,628,178 | Nelson | May 10, 1927 |
| 1,849,256 | Trovaton | Mar. 15, 1932 |
| 2,373,649 | Broome et al. | Apr. 17, 1945 |